United States Patent [19]
Zhao

[11] Patent Number: 5,358,452
[45] Date of Patent: Oct. 25, 1994

[54] BELT TENSIONING MECHANISM
[75] Inventor: Kai Zhao, Downers Grove, Ill.
[73] Assignee: Case Corporation, Racine, Wis.
[21] Appl. No.: 114,159
[22] Filed: Sep. 1, 1993
[51] Int. Cl.$^5$ .............................................. F16H 7/08
[52] U.S. Cl. .................................................. 474/133
[58] Field of Search ...................... 474/101, 109-111, 474/113-117, 133-138

[56] References Cited

U.S. PATENT DOCUMENTS

| | | | |
|---|---|---|---|
| 4,094,205 | 6/1978 | Cook | 74/242.1 FP |
| 4,283,181 | 8/1981 | Sproul | 474/110 |
| 4,440,930 | 8/1983 | Huhman et al. | 56/11.6 |
| 4,932,926 | 6/1990 | Lauderbach et al. | 474/110 |
| 5,025,614 | 6/1991 | Orsborn et al. | 56/11.6 |
| 5,116,284 | 5/1992 | Cho | 474/110 |
| 5,176,580 | 1/1993 | Stamm et al. | 474/101 |
| 5,176,581 | 1/1993 | Kumm | 474/110 |

FOREIGN PATENT DOCUMENTS 2707247 8/1978 Fed. Rep. of Germany .
995495 12/1951 France .

Primary Examiner—Michael Powell Buiz
Attorney, Agent, or Firm—Jansson & Shupe, Ltd.

[57] ABSTRACT

Disclosed is a belt tensioning system having a lever, an idler pulley attached to the lever and contacting a belt, and a fluid cylinder acting on the lever for belt tensioning. In the invention, the cylinder applies a force to the lever through a first moment arm and the pulley applies tensioning force to a belt through a second moment arm. Because of the unique arrangement, the tensioning force applied to the belt is substantially constant, notwithstanding that the lengths of the moment arms change with changes in lever position as the length of the belt changes.

13 Claims, 4 Drawing Sheets

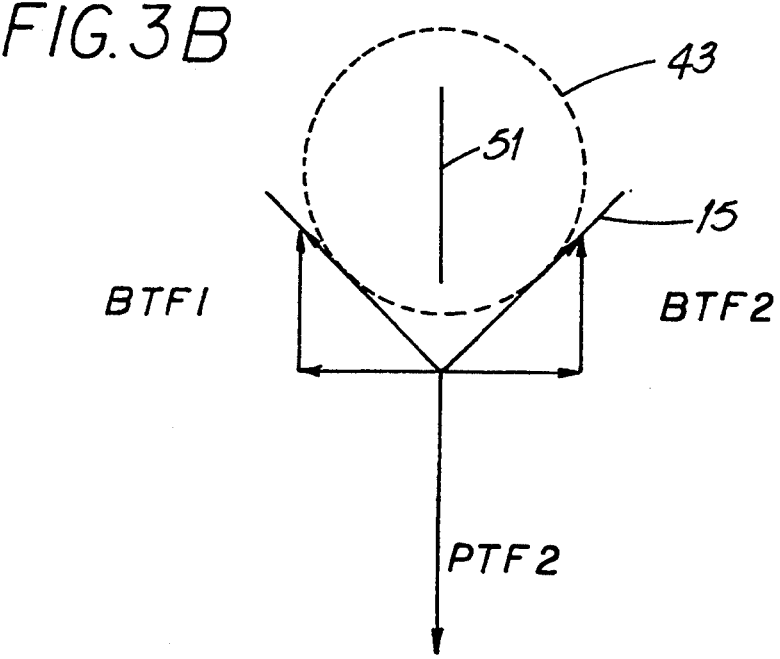
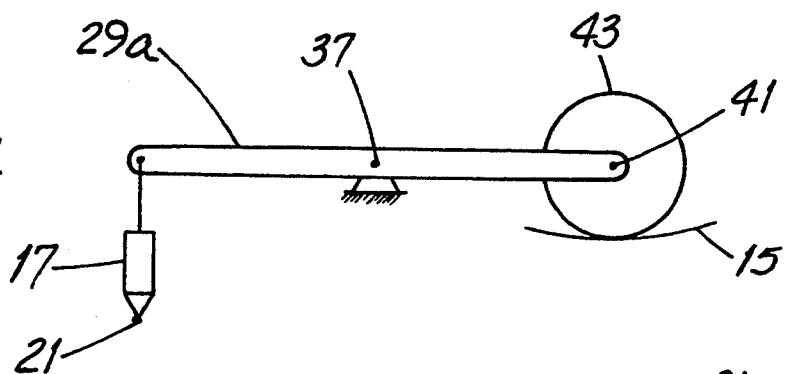
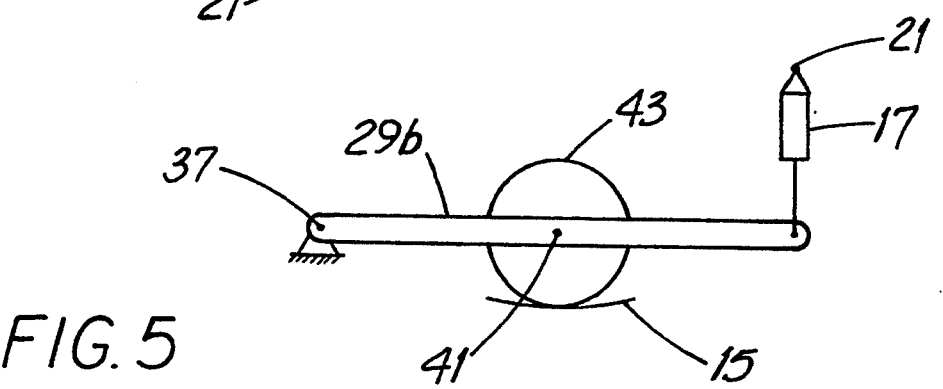

BELT TENSIONING MECHANISM

FIELD OF THE INVENTION

This invention relates generally to mechanical power transmission and, more particularly, to power transmission systems involving belt-and-pulley drives.

BACKGROUND OF THE INVENTION

Motive power is transmitted in a variety of ways including by drive systems having electric motors or internal combustion engines coupled to gears, shafts and the like. One type of motive power system involves a driving pulley coupled to a prime mover such as an engine, e.g., an internal combustion engine. The driving pulley is coupled to a driven pulley by one or more continuous or endless belts, e.g., a belt of the type often referred to as a "V-belt" because of its cross-sectional shape.

In drive systems of this type, belt tension is an important application parameter. The belt must "grip" the pulley (typically by friction but, in some drives, by using pulleys and belts which have engaging gear-like teeth) to transmit needed power to the driven mechanism. In other words, the drive designer anticipates nonslipping engagement of belt and pulley so that the drive can do its job of transmitting horsepower.

Motor vehicles have motive power systems of the belt-and-pulley type in that the vehicle engine has a driving pulley coupled by a belt to one or more driven pulleys. The driven pulleys power such components as a cooling fan, alternator, power steering pump and, perhaps, other accessories. Typically, one of such components (often the alternator) is mounted on a swinging bracket so that the belt can be tightened to the desired tension.

Yet another example of a type of machine having a motive power system of the belt-and-pulley type is an agricultural grain combine. And one way in which such a combine employs a belt-and-pulley drive is with respect to the unloading tube which transfers harvested grain from the combine to a haulage vehicle. Movement of grain along the tube is by a rotary auger, the shaft of which is coupled to a driven pulley. A driving pulley, powered by the combine engine, is coupled to the driven pulley by an endless belt.

Belt-and-pulley drives are of two general types. In one type, the belt and pulleys are continuously engaged and the belt continuously in tension. The belt-and-pulley drives on an automobile are arranged this way since it is desired to operate all accessories whenever the engine is running. A system of this general type is shown in U.S. Pat. No. 5,176,580 (Stamm et al.).

In another type having an idler pulley (which is solely a belt tension-adjusting device), the belt is kept in tension by the idler pulley but can be "relaxed" when such pulley is moved out of the drive position. When the belt is relaxed, there is insufficient frictional engagement of the belt and the pulleys and the driven pulley stops rotating. A system arranged in this way is shown in U.S. Pat. No. 4,400,930 (Huhman et al.).

Almost irrespective of the particular application for which the belt-and-pulley drive system is used, such systems tend to be characterized by certain disadvantages. One disadvantage is that after exposure to tension and, probably, heat for an extended time, the drive belt tends to stretch slightly. In drives where a particular belt tension is required to transmit the required horsepower, a significant reduction in such tension will cause the belt to slip (to a lesser or greater degree), perhaps even enough to stop the drive.

Another disadvantage is that even with new drive belts nominally meeting a particular length specification, the overall length of the belt tends to vary modestly from belt to belt and/or from manufacturer to manufacturer. In either situation (involving stretched belts or new belts of slightly differing length), some means must be provided to maintain or regain desired belt tension.

One way to do so is by using tensioning springs, either per se as shown in French Patent ("Brevet D'Invention") No. 995.495 or within a housing as shown in U.S. Pat. No. 5,16,284 (Cho). However, a disadvantage of tensioning springs is inherent in the characteristics of a spring.

That is, a spring exerts a specified amount of force for each dimensional unit that the spring is compressed (or stretched) from its length of repose. For example, if a compression spring 5 inches long in repose and having a rating of 20 pounds per inch is compressed to a length of 3 inches (i.e., shortened by 2 inches), the spring exerts a force of 40 pounds (20 lbs./inch times 2 inches). If, because of belt stretch, the spring is permitted to extend to, say, 4 inches in length, it will then exert a force of only 20 pounds. Such inherent spring characteristics make it difficult to maintain substantially constant belt tension.

Another way to maintain desired belt tension is by using some sort of powered actuator. Offenlegungsschrift 27 07 247 (German patent document) shows an idler pulley mounted to a lever moved by an electrically powered linear actuator. U.S. Pat. Nos. 5,025,614 (Orsborn et al.) and 4,283,181 (Sproul) show belt tensioning arrangements involving hydraulic actuators.

The Sproul patent states that its constant-pressure actuator provides a constant tensioning force on the belt. Disregarding whether this assertion is correct (and given the depicted lever arrangement, there is certainly room for doubt), it overlooks the fact that constant tensioning force will not result in constant belt tension in situations involving belts having significantly disparate lengths. The reason underlying such fact will be apparent after appreciating the invention and the detailed description thereof.

An improved belt tensioning mechanism overcoming some of the problems and shortcomings of prior art arrangements and, particularly, providing substantially constant belt tension even with a belt having a significant variance in length would be an important advance in the art.

OBJECTS OF THE INVENTION

It is an object of the invention to provide an improved belt tensioning mechanism overcoming some of the disadvantages of prior art belt tensioning systems.

Another object of the invention is to provide an improved belt tensioning mechanism for use in belt-and-pulley drives incorporating a belt of significantly varying length.

Another object of the invention is to provide an improved belt tensioning mechanism maintaining a belt at substantially constant tension notwithstanding significant variances in belt length.

Yet another object of the invention is to provide an improved belt tensioning mechanism incorporating a unique geometrical arrangement for maintaining belt tension.

How these and other objects are accomplished will become apparent from the following descriptions of the invention and from the drawing.

SUMMARY OF THE INVENTION

The invention involves a technical field sometimes referred to as "engineering mechanics" and, more specifically, that aspect of engineering mechanics relating to free-body diagrams, bodies in equilibrium, moment arms and force vector analysis. Such aspect is often referred to as "statics."

The invention is an improvement in a belt tensioning mechanism of the type having a lever and an idler pulley attached to the lever and contacting a belt. A fluid cylinder, e.g., pneumatic or hydraulic, acts on the lever for belt tensioning.

In the improvement, the lever is elongate, extends along a lever axis and is mounted for pivoting movement between a first position and a second position. The cylinder has a head end attached to a pivot mount and the cylinder pivots as the lever moves between the first position and the second position.

The cylinder applies a force to the lever along a rod axis and through a moment arm, the length of which at the first position is different than (and, in a preferred embodiment, less than) its length at the second position. Belt tension is substantially constant, irrespective of lever position.

Additionally, the included angle between the lever axis and the rod axis increases as the lever moves from the first position toward the second position.

In another aspect of the invention, the moment arm, i.e., that through which the cylinder applies force to the lever, is a first moment arm and the pulley applies tensioning force to the belt through a second moment arm. When the lever is in the first position, the length of the second moment arm is different from the length of such moment arm when the lever is in the second position. However, the product of the cylinder force and the first moment arm is substantially equal (in absolute terms, i.e., disregarding algebraic sign) to the product of the tensioning force and the second moment arm for any position of the lever.

In yet another aspect of the invention, the lever has proximal and distal ends and is mounted at its proximal end for pivoting movement. The idler pulley is attached at the distal end and the cylinder applies force to the lever at a point between, i.e., intermediate, the ends.

In another aspect of the invention, the pulley applies tensioning force to the belt at a locus and along a force axis. The belt has substantially straight segments which are in tension, which extend away from the idler pulley and which apply resistive forces to the pulley at the locus. The vector summation of the tensioning force and the resistive forces with respect to the locus is substantially zero, irrespective of lever position. Further, the resistive forces are substantially equal, irrespective of whether the lever is in the first position or the second position.

Other aspects of the invention are set forth in the following detailed description and in the drawing.

BRIEF DESCRIPTION OF THE DRAWINGS

FIG. 3B is the vector diagram when the mechanism is in the second position shown in FIG. 3A. Such diagram shows the tensioning force and the resistive forces resulting from the tensioned belt.

FIG. 4 is a representative side elevation view of another embodiment of the invention involving a first class lever.

FIG. 5 is a representative side elevation view of yet another embodiment of the invention involving a second class lever.

DETAILED DESCRIPTION OF PREFERRED EMBODIMENTS

Before describing the preferred embodiments, it will be helpful to set forth a few principles from the technical field known as engineering mechanics. The moment of a force with respect to a line perpendicular to a plane containing the force (i.e., with respect to a moment axis) is the product of the force and the perpendicular distance from the force to the line or moment axis. When portrayed graphically as in a drawing, a straight arrow having a particular length and direction is often referred to as a vector. By its length, a vector represents the magnitude of a force and by its orientation or direction, it represents the direction in which the force acts. The foregoing is based upon *Engineering Mechanics*, Second Edition, by Archie Higdon and William B. Stiles, ©1955, Prentice-Hall, Inc., publisher.

Figure 1:
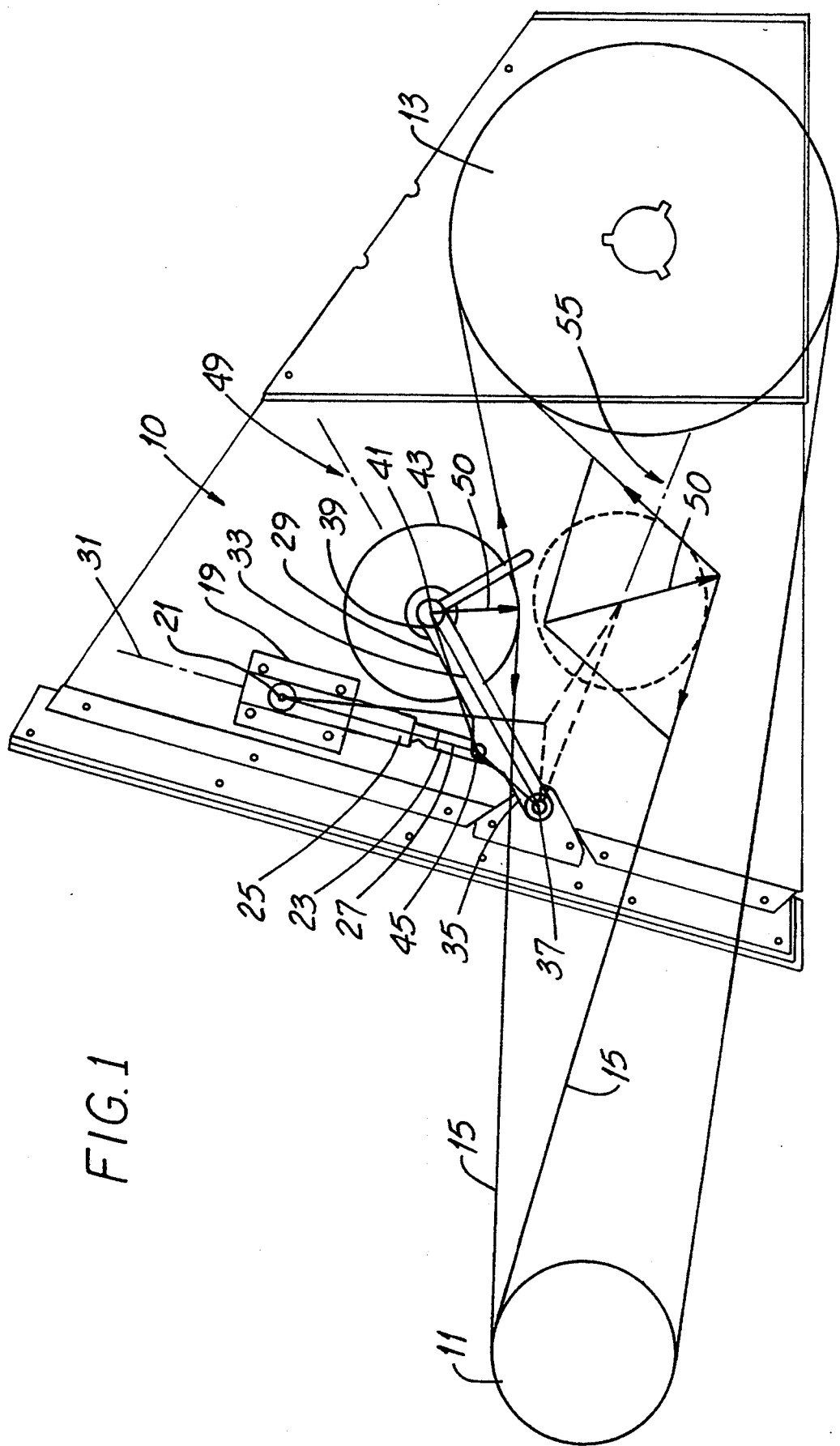
FIG. 1 is a side elevation view of the improved belt tensioning mechanism shown in conjunction with a driving pulley, a driven pulley and a drive belt. A first position of the mechanism is shown in solid outline and a second position of such mechanism is shown in a representative dashed outline. The illustrated arrangement involves a third class lever.

Referring now to FIG. 1, the new belt tensioning mechanism 10 is shown in conjunction with a driver pulley 11, a driven pulley 13 and a flexible drive belt 15, e.g., a V-belt, extending around the pulleys 11, 13. Such pulley drive arrangements are used in, among other applications, crop harvesting equipment. For example, the header of a grain combine is often driven using such an arrangement.

The driver pulley 11 is connected to the equipment prime mover, e.g., an internal combustion engine, by gears and shafts and transmits engine horsepower to the driven pulley 13 through the belt 15. Proper belt tension is an important factor in maintaining the horsepower-transmitting capability of the belt 15 in that there are no belt teeth engaging either pulley 11, 13; power transmission is solely by friction. That is, the belt 15 and each pulley 11, 13 must have sufficient frictional engagement such that the belt 15 does not slip. Such frictional engagement is maintained by maintaining proper belt tension.

As described above, the belt 15 tends to stretch and lengthen over time and steps must be taken to retain proper belt tension in spite of such lengthening. And even new belts 15 tend to have slightly differing lengths. Therefore, in many applications, it is preferred to provide a mechanism which addresses these facts.

The inventive mechanism 10 does so in a unique way and in a uniquely effective way.

The mechanism 10 includes a fluid cylinder 17 (hydraulic or pneumatic) having its head end 19 pivotably attached to a pivot mount 21. A rod 23 extends from the rod end 25 of the cylinder 17, has its distal end 27 pivotably coupled to a lever 29 and is capable of movement in either direction along a rod axis 31 coincident with the rod 23. While the rod 23 is capable of such movement (and, therefore, can exert either a downward force or an upward force), the mechanism 10 uses the cylinder 17 to provide a generally downward force against the lever 29.

The elongate, generally straight lever 29 extends along a lever axis 33 and has its proximal end 35 pivotably attached to a pivot mount at a pivot axis 37. Its distal end 39 is attached to an idler pulley support axle 41 and an idler pulley 43 is mounted on and rotates about such axle 41. The cylinder rod 23 is pivotably attached to the lever 29 at a point 45 between the ends 35, 39 and applies a rod force (as represented by arrow RF) at such point 45. Such generally downward force exerted on the lever 29 by the cylinder 17 urges the idler pulley 43 against the belt 15 to maintain belt tension.

Figure 2A:
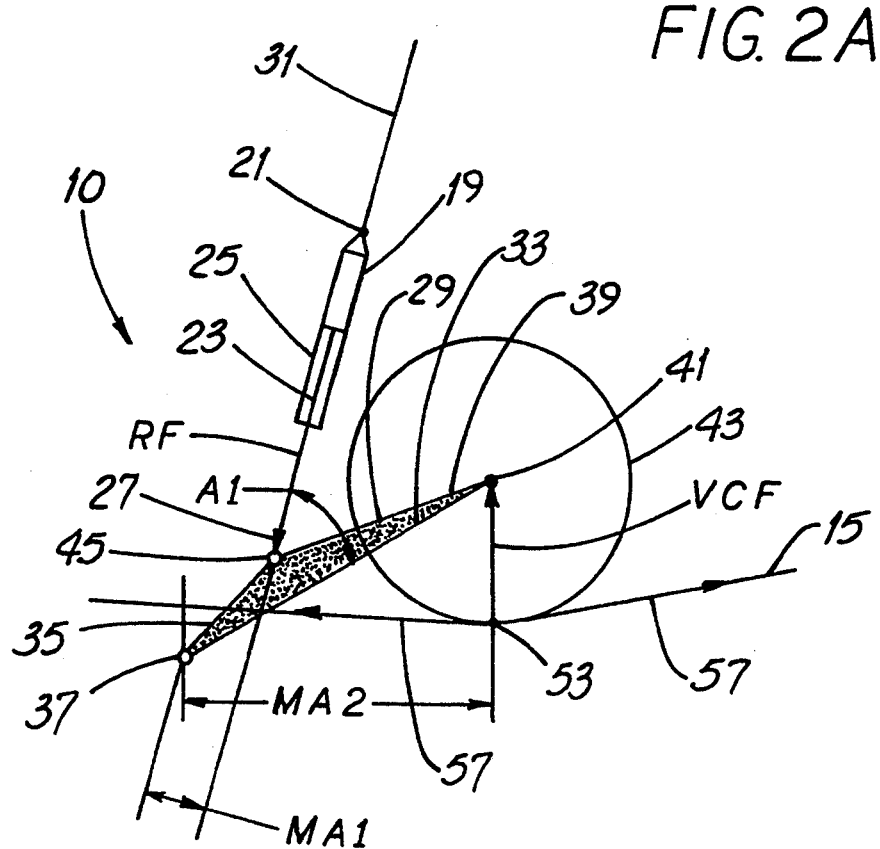
FIG. 2A is a simplified side elevation view of the mechanism of FIG. 1 with the mechanism shown in the first position.

Referring additionally to FIG. 2A, the mechanism 10 is shown in a first position 49 such as would prevail with a new (or relatively new) unstretched belt 15. The cylinder 17 applies a force to the lever 29 along the rod axis 31 and such force acts through a first moment arm, the length of which is designated as "MA1." (Recalling the above definition, MA1 is the perpendicular distance from the rod force RF applied along the rod axis 31 to the moment axis which, in the illustrated arrangement, is coincident with the pivot axis 37.)

The idler pulley 43 applies tensioning force (represented by the arrow 50) to the belt 15 along a force axis 51 and at the locus 53 of most effective belt contact. If, like the pulley 43, the belt 15 was also made of incompressible material (not possible, as a practical matter), the locus 53 would be essentially a point. Because of some inherent belt compressibility, the locus 53 is a relatively small area of belt/pulley contact. Such tensioning force 50 is applied to the belt 15 through a second moment arm, the length of which is designated as "MA2." MA2 is the perpendicular distance from the pivot axis 37 to the tensioning force 50. As the belt 15 stretches, the cylinder 17 pivots (counterclockwise as shown in FIGS. 1, 2A and 3A) as the lever 29 moves from the first position 49 toward the second position 55 illustrated in FIG. 3A.

Figure 3A:
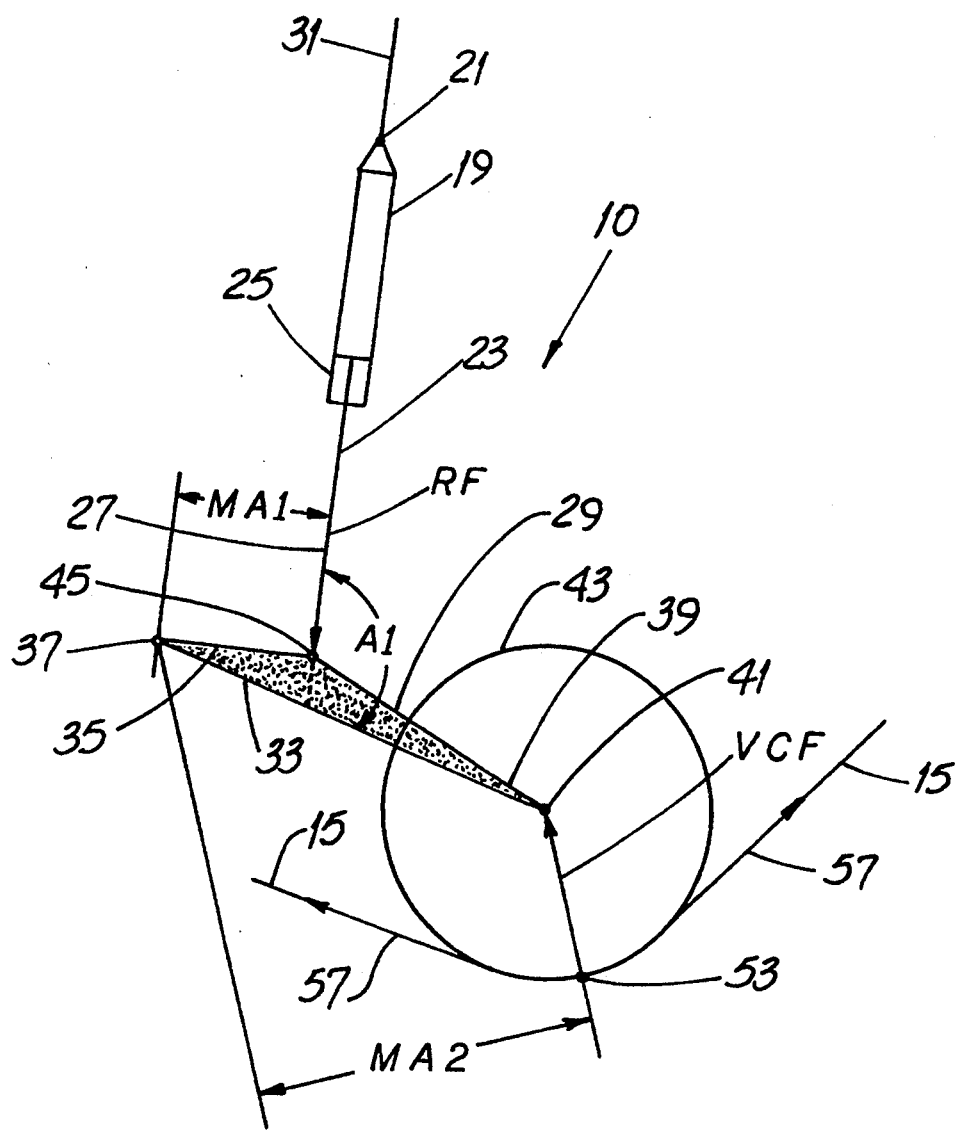
FIG. 3A is a simplified side elevation view of the mechanism of FIG. 1 with the mechanism shown in the second position.

Certain aspects of the mechanism 10 will now be appreciated and when doing so, it should be understood that the arrows representing forces in FIGS. 2A and 3A are not vectors. They merely show directions of forces.

At the first position 49 of the lever 29, the length of the first moment arm MA1 is different from the length of such moment arm MA1 at the second lever position 55. Such difference is apparent from a comparison of FIGS. 2A and 3A. Another is that the included angle A1 between the lever axis 33 and the rod axis 31 increases as the lever moves from the first position 49 toward the second position 55. Yet another aspect of mechanism 10 is that the length of the second moment arm MA2 changes as the lever 29 moves from the first position 49 toward the second position 55.

Considering further FIGS. 2A, 2B, 3A and 3B (FIGS. 2B and 3B including vectors), the pulley 43 applies a pulley tensioning force PTF1 (FIG. 2B) or PTF2 (FIG. 3B) to the belt 15 at a locus 53 and along a force axis 51. The belt 15 has substantially straight segments 57 which are in tension and which extend away from the idler pulley 43. The resistive belt tension forces resulting from each segment 57 being in tension are represented as vectors BTF1 and BTF2, respectively. The vector summation of the tensioning force PTF1 and the resistive forces BTF1, BTF2 with respect to the locus 53 is substantially zero, irrespective of lever position.

Figure 2B:
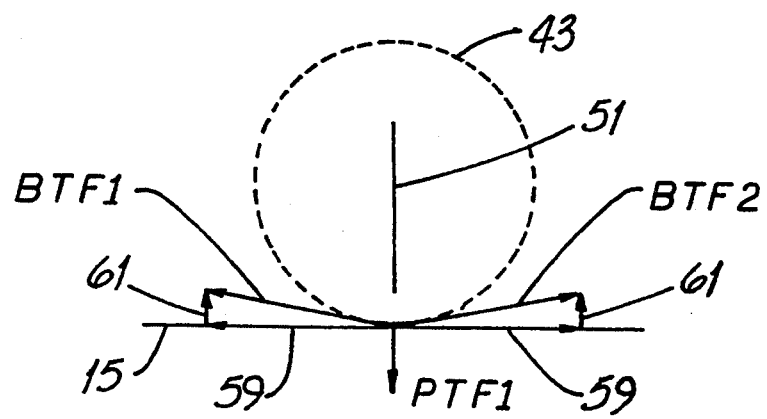
FIG. 2B is the vector diagram when the mechanism is in the first position shown in FIG. 2A. Such diagram shows the tensioning force and the resistive forces resulting from the tensioned belt.

This vector summation is graphically represented in FIGS. 2B and 3B. In FIG. 2B, either vector BTF1 or BTF2 can be "resolved" or broken down into a horizontal component 59 and a vertical component 61. (Notwithstanding the location of the vertical components 61 as illustrated in FIG. 2B, it will be appreciated by students of engineering mechanics that such components 61 act at the locus 53, not spaced therefrom.)

Since the vectors BTF1 and BTF2 are equal in magnitude (recall that the belt 15 is under substantially constant tension along the belt length under analysis), the horizontal components 59 are also equal in magnitude to one another but opposite in direct and, therefore, cancel one another. On the other hand, the vertical components 61 (which are also equal in magnitude to one another) act in the same direction and are therefore additive. This is graphically portrayed by the fact that the length of the vector PTF1 is twice as along as the length of each vertical component 61 and acts in the opposite direction as such components 61. The same type of analysis applies with respect to FIG. 3B.

It is also to be noted that each resistive force BTF1, BTF2 is substantially unchanged, irrespective of whether the lever 29 is in the first position 49 or the second position 55 or, for that matter, anywhere in between. This fact is graphically portrayed in that the length of the vectors BTF1 and BTF2 is the same in FIGS. 2B and 3B.

Since such resistive force BTF1 or BTF2 is synonymous with belt tension, it necessarily follows that belt tension is also substantially unchanged. To put it another way, while the directions of the vectors BTF1 and BTF2 change as the lever 29 moves between positions, the magnitude of the force represented by such vectors BTF1, BTF2 does not change, at least does not change appreciably.

And the foregoing is achieved using substantially constant fluid input pressure at the cylinder 17. It is to be appreciated that in an off-road vehicle such as an agricultural combine, there is a certain amount of jostling and "bounce" as the machine moves across the field. In other words, components such as the lever 29, pulley 43 and cylinder 17 may move slightly during travel and this may cause the instantaneous cylinder pressure to oscillate. However, such oscillation is with respect to a generally constant pressure.

It therefore follows that if the cylinder input pressure is substantially constant, the downward force (represented by the arrow RF) exerted by its rod 23 is substantially constant. After analyzing the following explanation, it will be appreciated how the new belt tensioning mechanism 10 retains constant belt tension with constant input pressure, notwithstanding that the angles of the forces change appreciably.

A few additional principles and mathematical formulas will further aid understanding of the invention. Disregarding the aforementioned oscillating movement (which is substantially absent if the machine travels on a smooth surface), the lever 29 is in force equilibrium and, but for occasional minute shifts in position, does not pivot about the axis 37. If a body is in force equilibrium, the algebraic summation of all of the moments of force acting on the body are zero.

The summation of the moments of force on the lever 29 is the algebraic sum of (a) the product of the rod force (a constant downward force represented by the arrow RF) and the first moment arm MA1, and (b) the product of the summed vertical components 61 of the resistive forces acting along the force axis 51 (represented by the upward-acting arrow VCF) and the second moment arm MA2 is equal to zero. (It is to be appreciated that if arrow VCF were portrayed in vector form, it would be equal in length to vector PTF1 or PTF2, as the case may be, and opposite in direction).

The equation is expressed as:

$$(RF \times MA1) \times (-VCF \times MA2) = 0$$

This relationship is true, irrespective of whether the lever 29 is at the first position 49, the second position 55 or anywhere in between.

After appreciating the foregoing, persons of ordinary skill will readily understand how the new mechanism 10 can be arranged using a first class lever 29a as shown in FIG. 4 or a second class lever 29b as shown in FIG. 5. Neither the fundamental principles nor the analysis thereof changes; only the relative locations (with respect to the lever 29) of the cylinder 17, the idler pulley 43 and the pivot axis 37 change.

While the invention has been described in connection with specific embodiments, it should be understood clearly that such description is by way of example and is not limiting.

I claim:

1. In a belt tensioning system having a lever, an idler pulley attached to the lever and contacting a belt, and a fluid cylinder acting on the lever for belt tensioning, the improvement wherein:
   the lever is mounted for pivoting movement between a first position and a second position;
   the cylinder is free of springs and applies a substantially constant force to the lever through a moment arm;
   the length of the moment arm at the first position is different than the length of the moment arm at the second position; and,
   belt tension is substantially constant, irrespective of lever position and irrespective of the length Of the moment arm.

2. The system of claim 1 wherein the cylinder has a head end attached to a pivot mount and the cylinder pivots as the lever moves between the first position and the second position.

3. The system of claim 2 wherein:
   the lever is elongate and extends along a lever axis;
   the cylinder has a rod extending along a rod axis; and,
   the included angle between the lever axis and the rod axis increases as the lever moves from the first position toward the second position.

4. The system of claim 1 wherein the cylinder fluid input pressure is substantially constant.

5. The system of claim 3 wherein the cylinder fluid input pressure is substantially constant.

6. The system of claim 1 wherein:
   the moment arm is a first moment arm;
   the pulley applies tensioning force to the belt through a second moment arm; and,
   the length of the second moment arm changes as the lever moves from the first position toward the second position.

7. The system of claim 6 wherein the product of the cylinder force and the first moment arm is substantially equal to the product of the tensioning force and the second moment arm for any position of the lever.

8. The system of claim 7 wherein the cylinder force is substantially constant for any position of the lever.

9. The system of claim 1 wherein:
   the lever has proximal and distal ends;
   the lever is mounted at its proximal end for pivoting movement;
   the idler pulley is attached at the distal end; and,
   the cylinder applies force to the lever at a point intermediate the ends.

10. The system of claim 5 wherein:
    the lever has proximal and distal ends;
    the lever is mounted at its proximal end for pivoting movement;
    the idler pulley is attached at the distal end; and,
    the cylinder applies force to the lever at a point intermediate the ends.

11. The system of claim 8 wherein:
    the lever has proximal and distal ends;
    the lever is mounted at its proximal end for pivoting movement;
    the idler pulley is attached at the distal end; and,
    the cylinder applies force to the lever at a point intermediate the ends.

12. The system of claim 1 wherein:
    the pulley applies tensioning force to the belt at a locus and along a force axis;
    the belt has substantially straight segments in tension, extending away from the idler pulley and applying resistive forces to the pulley at the locus; and,
    the vector summation of the tensioning force and the resistive forces with respect to the locus is substantially zero, irrespective of lever position.

13. The system of claim 12 wherein the resistive forces are substantially equal to one another, irrespective of whether the lever is in the first position or the second position.

* * * * *